United States Patent [19]

Hufford et al.

[11] Patent Number: 4,804,194

[45] Date of Patent: Feb. 14, 1989

[54] MECHANICAL SEAL LUBRICATION IMPROVEMENT

[75] Inventors: Larry A. Hufford, Vista, Calif.; Robert S. Wentworth, deceased, late of Murrieta, Calif.; by Benning Wentworth, executor, St. Charles, Ill.

[73] Assignee: BW/IP International, Inc., Long Beach, Calif.

[21] Appl. No.: 108,965

[22] Filed: Oct. 15, 1987

[51] Int. Cl.$^4$ .......................... F16J 15/38; F16J 15/48
[52] U.S. Cl. ............................................ 277/3; 277/27
[58] Field of Search ............... 277/3, 27, 65, 74, 81 R, 277/96.1

[56] References Cited

U.S. PATENT DOCUMENTS

| 3,033,577 | 5/1962 | Spiess | 277/3 |
| 3,081,098 | 3/1963 | Stephens | 277/27 |
| 3,811,687 | 5/1974 | Honold et al. | 277/65 X |
| 4,511,149 | 4/1985 | Wiese | 277/3 |
| 4,552,368 | 11/1985 | Wallace | 277/27 |

Primary Examiner—Donald A. Griffin
Attorney, Agent, or Firm—Aubrey L. Burgess

[57] ABSTRACT

An improved lubricating system for mechanical seal assemblies in which baffle means are positioned closely adjacent to the seal faces forming restricted passages for the flow of lubricating fluid under pressure to the opposing seal faces especially when the pressure of the product fluid is relatively low.

9 Claims, 2 Drawing Sheets

FIG. 3

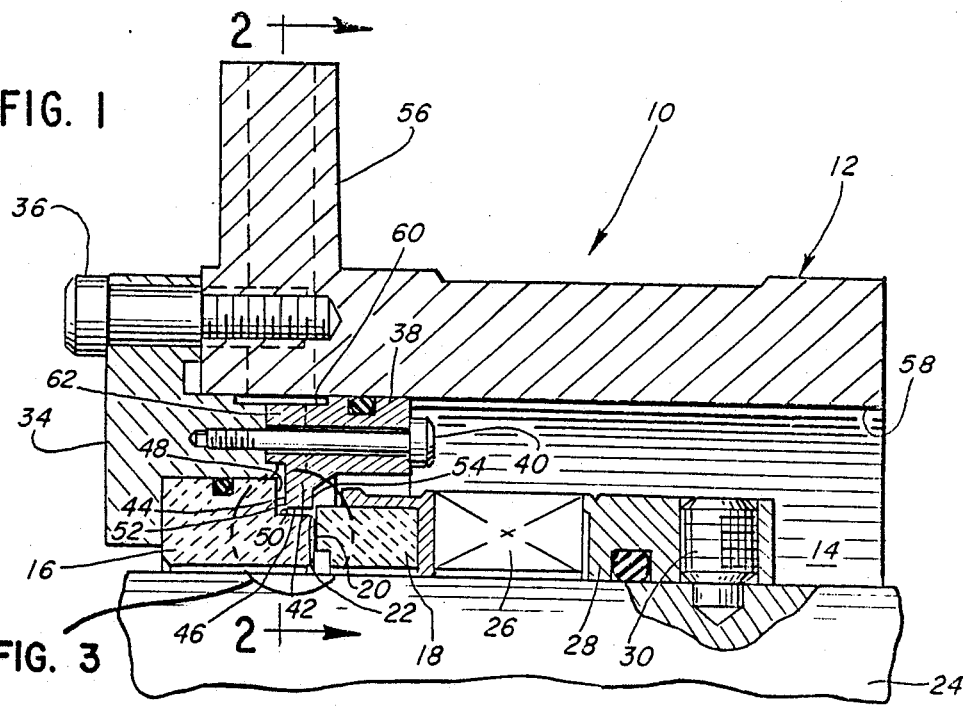
FIG. 1
FIG. 3
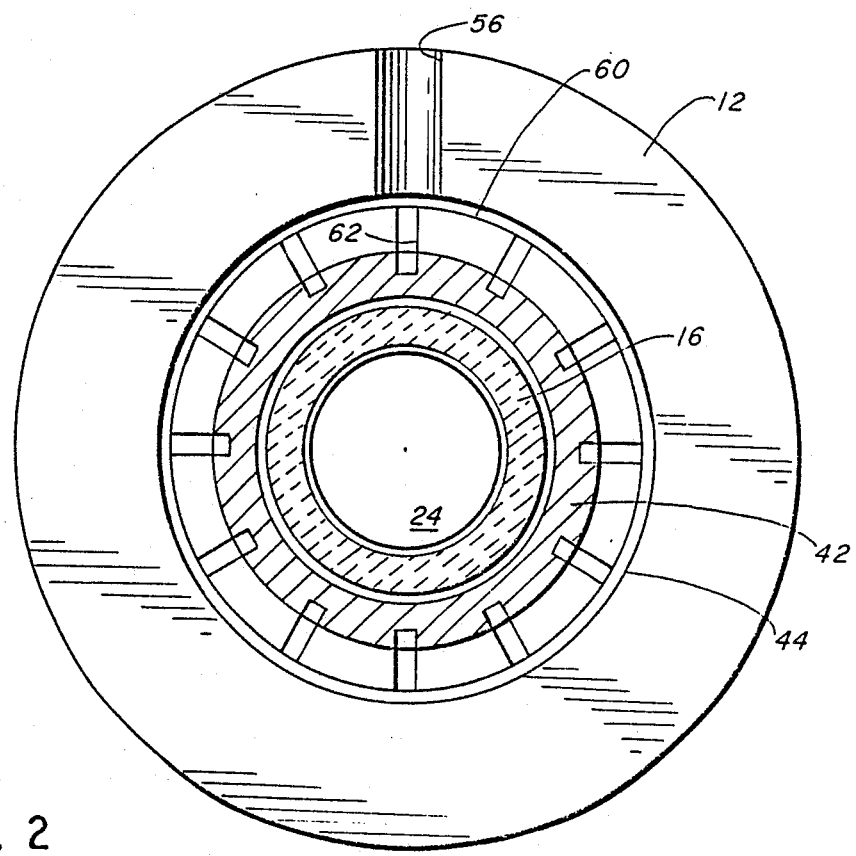
FIG. 2

MECHANICAL SEAL LUBRICATION IMPROVEMENT

BACKGROUND OF THE INVENTION

1. Field of the Invention

This invention relates to a mechanical seal assembly for sealing a rotary shaft to a housing having a shaft opening through which the shaft extends, and more particularly to a mechanical seal assembly having means for supplying lubrication into the annular sealing zone between the relatively rotatable seal rings to minimize film loss problems which may otherwise occur when the fluid pressure in the housing is relatively low.

2. Background Discussion

Mechanical seals depend on a thin film of the liquid that they are sealing to lubricate and cool their opposing seal faces. Conditions such as vaporization, air trapped in piping and other conditions when fluid pressure in the housing is relatively low can cause seals to lose the film with consequential damage or even complete failure. In addition, at start-up, the film is generally non-existent. It is common practice to provide a flow of liquid into the seal area to avoid the failure of the seal. Generally, liquid is injected into the seal area at a higher pressure than the fluid in the stuffing box. This adds to the expense of extra equipment and a supply of additional liquid. The injected liquid may simply be tapped from pump discharge, but this results in loss of recirculation energy and may require pressure dropping means such as orifices subject to problems of clogging and erosion. Where fluid is added, there are often considerable cost measures consequent to adding extra fluid to the process fluid being pumped. In many cases, the injected fluid is merely serving to provide turbulence and to wash away a slow buildup of gas from the stuffing box.

3. Description of the Prior Art

Heim, U.S. Pat. No. 3,236,529, issued Feb. 22, 1966, for MECHANICAL SEAL, teaches supplying lubricating fluid to the opposing seal faces of a seal by using the operating pressure of the pump discharge fluid to force some of the liquid being pumped back into the stuffing box.

Tracy, U.S. Pat. No. 3,486,760, issued Dec. 30, 1969, for MECHANICAL SEAL ASSEMBLY WITH LUBRICATING MEANS teaches supplying lubricating fluid to the opposing seal faces of a pair of seal rings through drilled passageways or bores in the non-rotatable seal ring to arcuate grooves in the non-rotatable seal ring face. A coupler connects the passageways in the seal ring to a source of lubricating fluid.

Wilk, U.S. Pat. No. 3,495,840, issued Feb. 17, 1970, for MECHANICAL SEAL START-UP LUBRICATING ARRANGEMENT teaches supplying a lubricating fluid to generally the center of the opposing seal faces of a pair of seal rings through drilled passages or bores in the non-rotatable seal ring and its back-up ring to arcuate grooves in the non-rotatable seal ring face. The fluid flows or is pumped outward across the opposing seal faces to a discharge location.

Wiese, U.S. Pat. No. 3,498,620, issued Jan. 22, 1968, for MECHANICAL SEAL LUBRICATION MEANS teaches structure similar to that taught by Wilk, supra, and adds a time-delay means for operating the fluid injection circuit to supply the lubricating fluid to the seal faces.

Lesiecki et al, U.S. Pat. No. 4,502,693, issued Mar. 5, 1985, for BUSHING SEAL WITH DUAL RESTRICTED FLUID PASSAGES teach supplying a sealing fluid at a pressure in excess o a pressure of a process fluid within the compressor structure when the compressor is not operating. The object is to keep bushing surfaces wet whenever a process gas may come in contact with a bushing surface. The sealing fluid traverses several restricted fluid passageways from its intake location to its outlet. Also provided is a bushing having radial surfaces exposed to fluid pressure which surfaces are sized to have "areas such that there is a high enough pressure unbalance across the bushing urging" a face thereof against a seal liner "to prevent axial movement of the bushing but low enough so that the bushing will not float with the shaft during operation . . . "

SUMMARY OF THE INVENTION

The invention to be herein described relates to a mechanical seal assembly which incorporates a seal flush baffle arrangement that significantly improves seal performance. The baffle arrangement can be supplied as an integral part of a stationary element and as a part of a cartridge, or can be provided as a separate insert, or as part of the seal flange or gland, i.e., as part of a seal housing.

In one form of the invention, an annular seal baffle is fixedly positioned over the seal rings, one of which is nonrotatable and received in the housing closure member with the other seal ring being rotatable, fixedly secured to the rotatable shaft, and resiliently urged toward the non-rotatable seal ring. The rings have opposed, radially arranged seal faces with relative rotation therebetween.

The annular seal baffle has a radially disposed ring-like portion which extends below the outer surface of the rotatable seal ring, so that a portion of the face of the seal ring is closely adjacent to a portion of the face of the ring-like portion. The opposite surface of the ring-like portion and its outer cylindrical surface are closely adjacent to the surfaces of an annular notch in the non-rotatable seal ring, thus forming a restricted flow path for lubricating fluid to the opposing seal faces. Lubricating fluid is injected into the restricted passages from a source outside the housing.

In a second form of the invention, a ring-like non-rotatable member is positioned in the annular notch of the non-rotatable seal ring, so as to provide a restricted passage therethrough, the face of the ring-like member is closely adjacent to a portion of the face of the rotatable seal ring in a manner similar to that described heretofore. Lubricating fluid is supplied to the restricted passage to flow to the opposing seal faces.

BRIEF DESCRIPTION OF THE DRAWINGS

FIG. 1 is a partial sectional view of a seal arrangement constructed according to this invention;

FIG. 2 is a sectional view taken on line 2—2 of FIG. 1;

DESCRIPTION OF THE PREFERRED EMBODIMENTS

Figure 3:
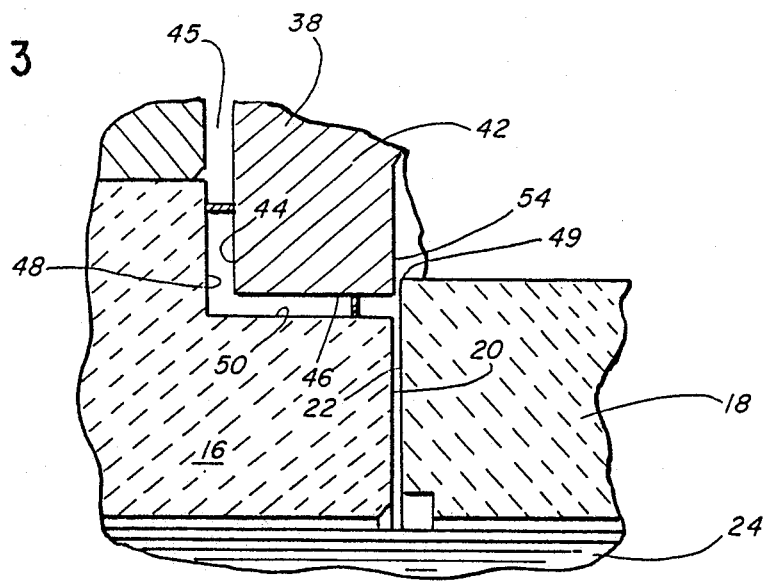
FIG. 3 is an enlarged sectional view of the circled part of FIG. 1.

Looking now at the drawings, a first embodiment of the invention is illustrated in FIGS. 1 to 3, wherein a seal assembly 10 is disposed within a fluid machine, not shown, as for example a pump and the like, having a seal housing 12 defining a generally cylindrical seal chamber 14. The seal assembly 10 comprises a pair of seal rings 16 and 18, each of which has a lapped seal face 20 and 22 opposing one another. The seal ring 16 is relatively stationary and non-rotatable while the seal ring 18 is rotatable with the shaft 24 of the fluid machine. The seal ring is resiliently urged toward the seal ring 16 by suitable means 26, as for example, a coiled compression spring or a bellows and the like. The seal ring 18 is connected to the shaft for rotation therewith by the resilient means 26 and a setting block 28, screw means 30 being used to secure the block 28 to the shaft 24 and to permit the axial positioning thereof with respect to the shaft 24.

The stationary, non-rotatable seal ring 16 is positioned in a shouldered, annular ring-like closure member or seal flange 34 secured to the housing 12 by a plurality of bolts and the like 36. An annular baffle means 38 is circumferentially arranged about the seal rings 16 and 18 and is secured to the member 34 by a plurality of bolts 40. The baffle means 38 cooperates with other elements of the seal assembly to provide a unique lubricant flow path to the opposing seal faces 20 and 22 as will hereafter be explained.

As illustrated in FIGS. 1 and 3, the baffle means 38 has a radially depending portion 42 which is positioned so that two of its defining surfaces 44 and 46 are closely adjacent to the surfaces 48 and 50 of an annular notch 52 in the seal ring 16, to define passageways 45 and 47 (see especially FIG. 3), while the remaining defining surface 54 is closely adjacent to a portion of the seal face 22 of the seal ring 18 to define a passageway 49. The spacing between the surface 54 and the surface of the seal face 22 is much less than the spacing between the surfaces 44 and 48, and 46 and 50. In other words, the passageway 49 is more restricted than the passageways 45 and 47.

The housing 12 is provided with a generally radially positioned bore 56 which terminates at the interior cylindrical surface 58 of the housing 12. An annular slot 60 is provided in the outer periphery of the baffle means 38 and the closure member or seal flange 34, and the baffle means is provided with one or more radially arranged passages or slots 62. Lubricating fluid is introduced as by being injected via a conduit or the like, not shown, to the bore 56 and thus into the annular slot 60, through the passages 62, between the baffle and the seal ring 16 to a location immediately adjacent to the opposing seal faces 20 and 22, the restriction between the surface 54 and the seal face 22 increasing the pressure of the fluid to the seal faces to provide improved lubrication of the seal faces especially when the pressure of the process fluid is relatively low.

The baffle arrangement 38 can be constructed as an integral part of the housing 12, or as part of the closure member or seal flange 34 if desired.

Figure 4:
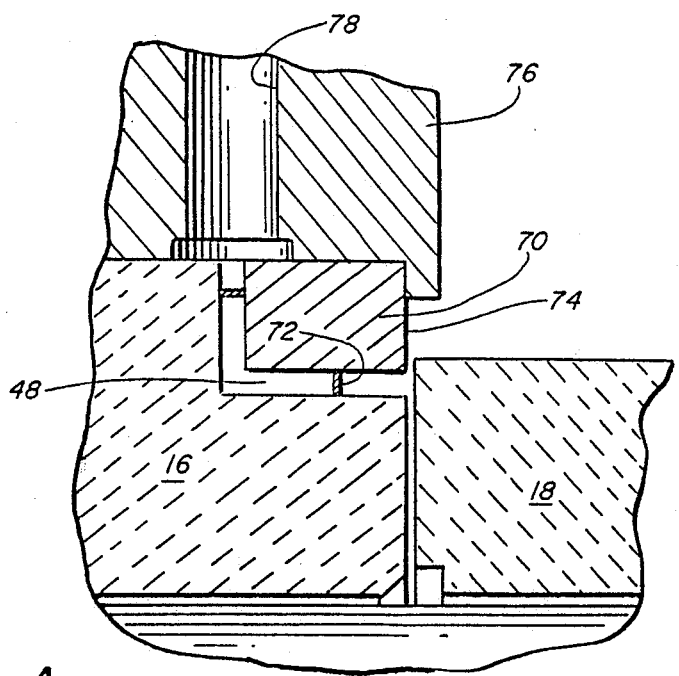
FIG. 4 is a partial sectional view of a second embodiment of the invention.

Turning now to FIG. 4, a second embodiment of the invention is illustrated in which a ring member 70 is positioned in the notch 52 of the seal ring 18, the ring member 70 being spaced from the notch surfaces 46 and 48 by spacer means 72, such that the lower portion of the face 74 of the ring member 70 is closely adjacent to the seal face 22. The ring member 70 abuts a closure member 76 having a passageway 78 therein to provide a path for the flow of lubricating fluid to the seal faces 20 and 22, as in the first embodiment of the invention.

One of the prime objectives of this invention is to insure an adequate flow of lubricating fluid to the seal faces, so as to lubricate the relatively rotating seal faces especially when the pressure of the product fluid is low. This condition occurs not only at start-up but at other times when the demand for fluid is relatively low or the fluid velocity head at the seal faces equals or exceeds the static pressure in the seal housing. Another advantage of the invention is the elimination of providing passages in seal rings, as taught by the prior art. Many seal rings are constructed of silicon carbide which is difficult to drill, being a very hard material.

The appended claims are intended to cover all reasonable equivalents and are to be construed as broadly as the prior art will permit.

We claim:

1. A mechanical seal assembly for machinery having a housing in which fluid is to be retained, and a shaft extending through at least a portion of the housing, which seal assembly comprises:
    a first non-rotatable seal ring positioned abutting the housing and surrounding the shaft, said first seal ring having a sealing face;
    a second rotatable seal ring positioned surrounding the shaft and connected thereto for rotation therewith, said second rotatable seal ring having a sealing face positioned opposite the sealing face of said first seal ring and to allow a fluid film between the sealing faces when the machinery is operated; said film extending from a first location adjacent the shaft to a second location spaced radially outwardly from the shaft; and
    means including a baffle for admitting fluid under pressure from a source outside of the housing to said second location to minimize film loss problems which may occur near the second location when the fluid pressure in said housing is too low.

2. A mechanical seal assembly as recited in claim 1, further comprising:
    a restricted passage defined by a portion of said baffle and a portion of said first seal ring for the passage of said lubricating fluid at said second location, said portion of said baffle being received in an annular notch in said first seal ring.

3. A mechanical seal assembly as recited in claim 1, further comprising a bore in said housing adapted to be connected to said source of lubricating fluid, a cylindrical distribution groove at least partly in said baffle communicating with said bore, and a restricted passage defined by a portion of said baffle and a portion of said first seal ring communicating with said cylindrical distribution groove for the passage of lubricating fluid to said second location.

4. A mechanical seal assembly as recited in claim 3, further comprising an annular notch in said first seal ring and receiving said portion of said baffle.

5. A mechanical seal assembly as recited in claim 1, further comprising a baffle ring received in an annular notch in said first seal ring and defining a restricted passage for the flow of lubricating fluid to said second location, said baffle ring having a surface closely adjacent the sealing face of said second seal ring and defining a restricted space therebetween.

6. A mechanical seal assembly as recited in claim 5, in which the restriction between the baffle surface and said second seal ring sealing face is greater than the restriction of the passage between the baffle and the first seal ring.

7. A mechanical seal assembly as recited in claim 1, in which said baffle is generally cylindrical, surrounds said seal rings and is connected to said housing with a radially depending ring portion positioned closely adjacent to said seal rings.

8. A mechanical seal assembly as recited in claim 1, in which said baffle is a generally cylindrical ring member received in a cylindrical notch in said first seal ring.

9. A mechanical seal assembly as recited in claim 8, in which spacer means space said ring member from said first seal ring.

* * * * *